United States Patent [19]

Feucht et al.

[11] 4,416,088
[45] Nov. 22, 1983

[54] MOTOR-VEHICLE SIDE DOOR

[75] Inventors: Klaus J. Feucht, Geimersheim; Egbert Rossie; Karl Bauer, both of Ingolstadt, all of Fed. Rep. of Germany

[73] Assignee: Audi NSU Auto Union AG, Ingolstadt, Fed. Rep. of Germany

[21] Appl. No.: 231,143

[22] Filed: Feb. 3, 1981

[30] Foreign Application Priority Data

Feb. 9, 1980 [DE] Fed. Rep. of Germany ....... 3004897

[51] Int. Cl.³ .............................................. B60J 5/04
[52] U.S. Cl. .................................................. 49/502
[58] Field of Search ................................ 49/502, 503

[56] References Cited

U.S. PATENT DOCUMENTS 3,782,036 1/1974 Clark et al. ........................... 49/502
4,306,381 12/1981 Presto ................................... 49/502

FOREIGN PATENT DOCUMENTS 2411865 3/1974 Fed. Rep. of Germany ........ 49/503
2236678 2/1975 France ................................. 49/502
1355225 6/1974 United Kingdom .................. 49/502

*Primary Examiner*—Kenneth Downey
*Attorney, Agent, or Firm*—Karl F. Ross; Herbert Dubno

[57] ABSTRACT

A motor-vehicle door has a generally annular door frame having an inner side and outer side respectively releasably connected to inner and outer door panels. A hinge is connected to one vertical edge of the frame between the sides and a latch to the opposite edge. A window pane is vertically displaceable in and above the frame and the mechanism for operating this window and for operating the latch are fixed to the inner panel. The frame is formed by a pair of frame parts together forming a tubular box-girder structure on the two upright sides and lower edge of the door for maximum rigidity.

8 Claims, 8 Drawing Figures

MOTOR-VEHICLE SIDE DOOR

FIELD OF THE INVENTION

The present invention relates to a side door of a motor vehicle. More particularly this invention concerns such a door having a window that can be raised and lowered.

BACKGROUND OF THE INVENTION

A motor-vehicle door has an outer panel, an inner panel, and a frame. Normally the outer panel and frame are integrally secured together by spot welding to form a rigid shell. This shell carries the hinge, door latch, and window guides for the window pane that slides up and down in the door. The latch-operating mechanism and the window-raising mechanism are carried on an inner panel which is releasably secured on the inner side of the door assembly constituted by the outer panel and frame. Such an arrangement is described in German Patent Publication 2,240,858.

Normally the various mechanisms are all pre-assembled on the inner door panel which must then be mounted and properly aligned in position on the outer door assembly in the plant. Any adjustment of, for instance, the window guides or the door latch requires this inner panel to be pulled off.

An attempt has been made to overcome this in British Pat. No. 1,355,255 wherein the inner door panel and frame are united to form a shell assembly to which the outer door panel is releasably secured. This arrangement has the considerable disadvantage that prefabricating the inner door panel with the various mechanisms becomes a relatively difficult job as the entire inner door assembly must be fabricated at the same time. Thus whatever ease of adjustment or the like is gained with such as assembly is more than lost by the difficulty of making the complex inner door shell with its various built-in mechanisms.

Another disadvantage of the known type of door is that it is frequently relatively weak at the critical regions, as for example adjacent the hinges. Attempts have been made to overcome this as, for example, in German Patent Document 2,628,871 of F. Waldhauser. Here a heavy-duty reinforcement fitting is provided at the hinge so that the lighter-duty sheet metal elements forming the door are not overly stressed. The use of such extra reinforcement fittings not only represents an additional expense, but also slows down production by requiring yet another part to be assembled onto the door.

OBJECTS OF THE INVENTION

It is therefore an object of the present invention to provide an improved motor-vehicle side door.

Another object is to provide such a door which can be assembled relatively easily, yet which allows easy access to and adjustment of the various mechanisms in the door once it is on the vehicle.

SUMMARY OF THE INVENTION

These objects are attained according to the instant invention in a motor-vehicle door having a generally annular door frame on whose inner side is releasably secured an inner door panel and on whose outer side is releasably secured an outer panel. A pair of hinges is connected to the frame at one horizontal edge thereof and a door latch at the opposite horizontal edge. In addition a window pane is vertically displaceable in and above the frame. Window-operating mechanism and a door-latching mechanism are provided on the inner panel connected to the pane and to the latch.

Thus under normal circumstances the frame is mounted in the door opening of the vehicle. The inner panel with all of the necessary hardware can then be secured onto the inner frame and the latch and window can be adjusted for proper closing. Then the outer panel is secured in place to close up the door. If readjustment or servicing of the various mechanisms in the door is required the outer panel can simply be removed again to give full access. Not only is the access better from the outside, but the necessity of working from inside the vehicle with the easily dirtied inner panel is also altogether eliminated.

According to the present invention the frame is provided with a flange defining its outer side and to which the outer door panel is releasably secured. This flange is formed with through-going holes through which screws, constituting the outer-panel retaining means, fit to secure the outer panel in place on the frame. If the outer door panel is made of a synthetic resin it can be provided with thickened regions at these holes so that self-tapping screws can extend from the inside through the holes in the flange into appropriate bores in the outer door panel. When the outer door panel is of metal nuts are soldered or welded to the frame at the holes.

Not only does having a removable outer panel make servicing of the door relatively easy, but also replacing this outer panel in case it gets damaged thus becomes an extremely simple operation. In addition the same basic door frame can be used on several different models of a vehicle, with only the outer panels changing, so as greatly to reduce manufacturing costs.

According to further features of this invention the outer panel is formed with one or two relatively large-diameter holes that align with threaded bores on the frame. Large-headed screws are threaded through these large-diameter holes into the threaded holes of the frame for positioning of the outer door panel exactly with respect to the rest of the motor vehicle. When the exact position has been obtained by shifting of the outer door panel around on the loosely received shanks of the screws, these screws are tightened. Thereupon further screws are threaded from the frame side into the back of the outer door panel through similarly large holes in the frame. The exposed heads of the positioning screws can then be convered by a conventional trim strip. Such as arrangement allows the outer door panel to be centered very exactly in the door opening.

The door frame according to the instant invention can be formed of inner and outer frame parts. These parts are joined together so as to form a tube or box girder along at least the two vertical sides of the door for maximum stiffness. The frame parts are nonetheless only made of relatively inexpensive stamped sheet metal, but when thus assembled can have all the rigidity of much heavier cast parts.

SPECIFIC DESCRIPTION

Figure 1:
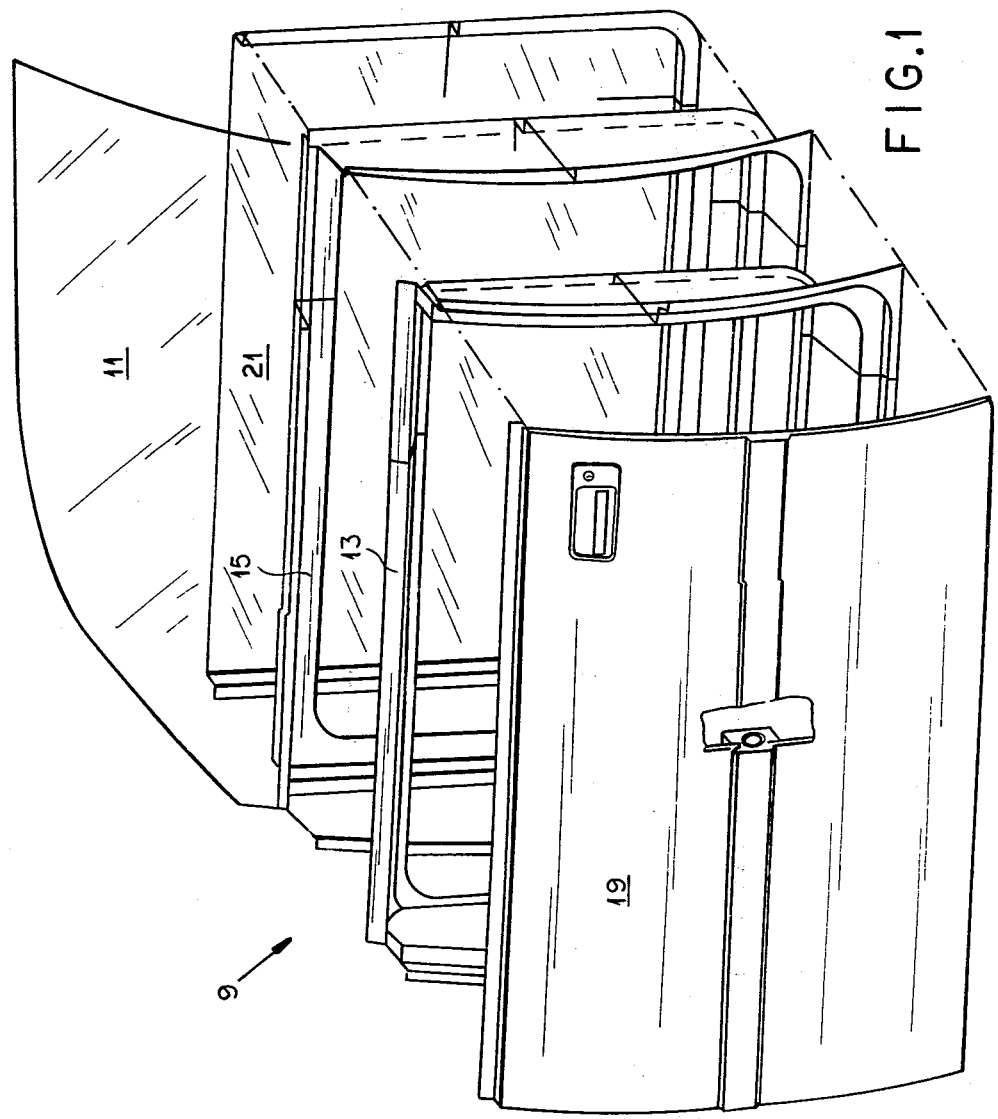
FIG. 1 shows in exploded view a door according to the instant invention.
Figure 2:
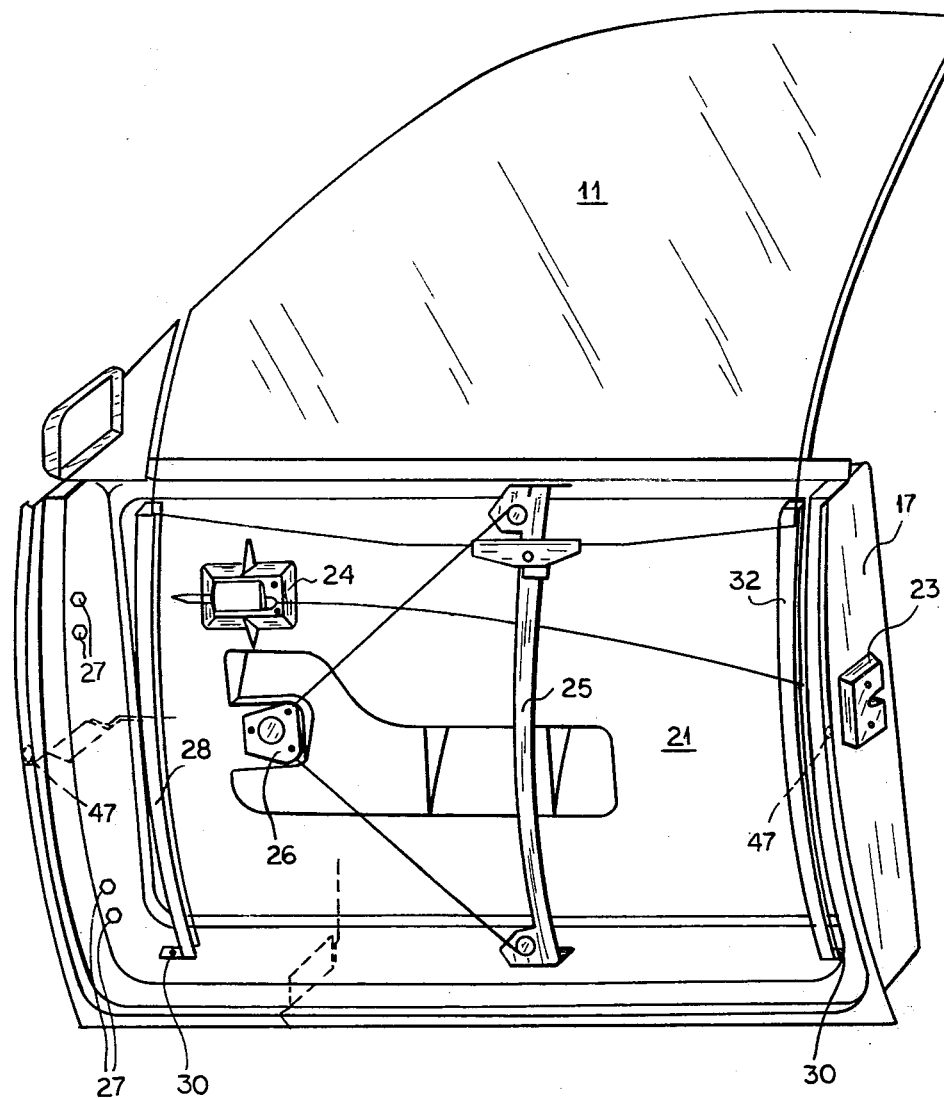
FIG. 2 is a side view of a door according to this invention with the outer door panel removed.

As seen in FIGS. 1 and 2 a motor-vehicle side door 9 has a window panel 11 and an annular door frame 17 formed by an outer door-frame part 13 and an inner door-frame part 15. An outer panel 19 is secured to the outer side of the frame 17 and an inner panel 21 to the inner side thereof.

A door latch 23 carried on one vertical edge of the frame 17 is operated by means of a door-opening mechanism 24. In addition a window-lifting mechanism 25 is operated by means of an operator 26 carried like the mechanism 24 on the inner panel 21. The window 11 slides in channel guides 28 secured at 30 to the lower horizontal portion of the frame 17.

Figure 3:
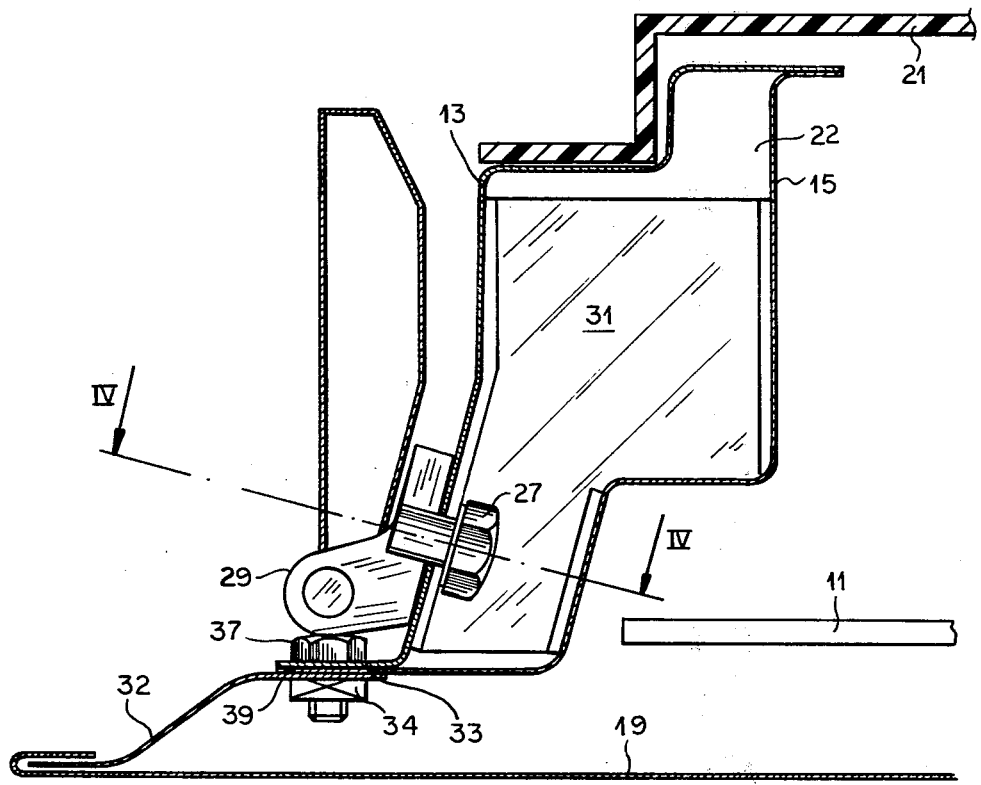
FIG. 3 is a vertical section through the door of FIGS. 1 and 2 adjacent the hinge.
Figure 4:
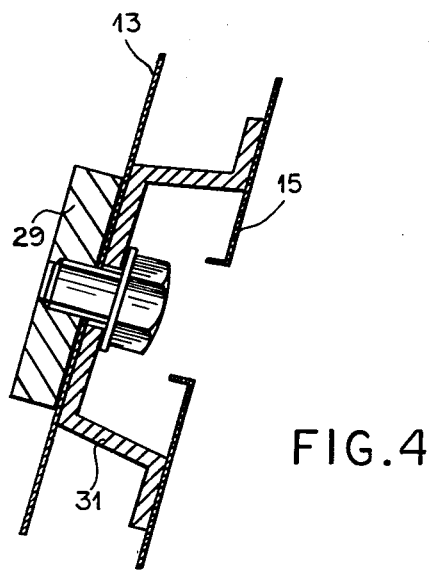
FIG. 4 is a section taken along line IV—IV of FIG. 3.
Figure 7:
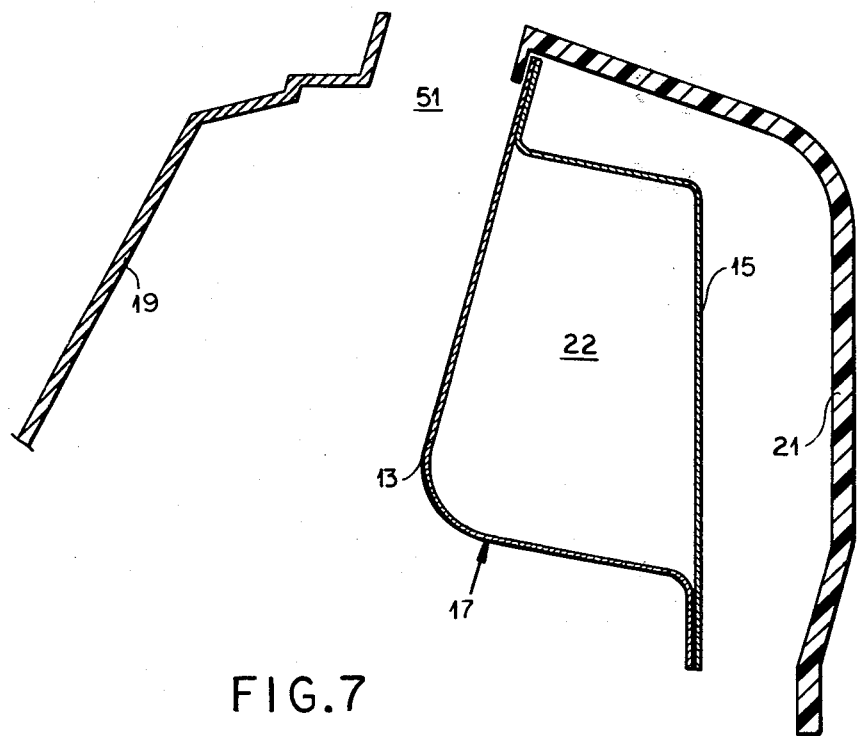
FIGS. 7 and 8 are vertical sections taken at the upper and lower portions of the door according to this invention.
Figure 8:
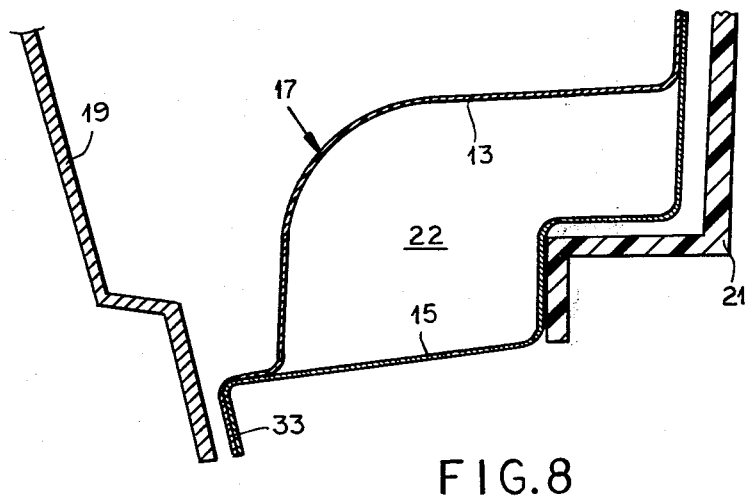

The door hinges 29 are secured to the front vertical edge of the frame 17 as best seen in FIG. 3. FIGS. 3, 7 and 8 also show how the two sheet-metal door parts 13 and 15 forming the frame 17 form a hollow passage 22 receiving a reinforcement element 39 at each hinge 29 and forming a U-shaped box-girder making the frame 17 extremely rigid. The two sheet-metal frame parts 15 and 17 are spot welded permanently together into the desired shape. They form a slot 51 (FIG. 7) through which the window 11 can pass vertically.

As seen in FIG. 3 the two frame parts 13 and 15 have identical flanges 33 formed with throughgoing holes 39. The outer door panel 19 is provided with an inwardly extending strip or flange member 32 formed facing each of the holes 39 with a throughgoing hole and on its outer face with a nut 34 that is soldered in place. The holes 39 are substantially larger in diameter than the threaded holes of the nuts 34 so that screws 37 having relatively skinny shanks can pass through these holes 39 and thread into the nuts 34 while still allowing some displacement of the outer panel 19 relative to the frame 17.

Figure 5:
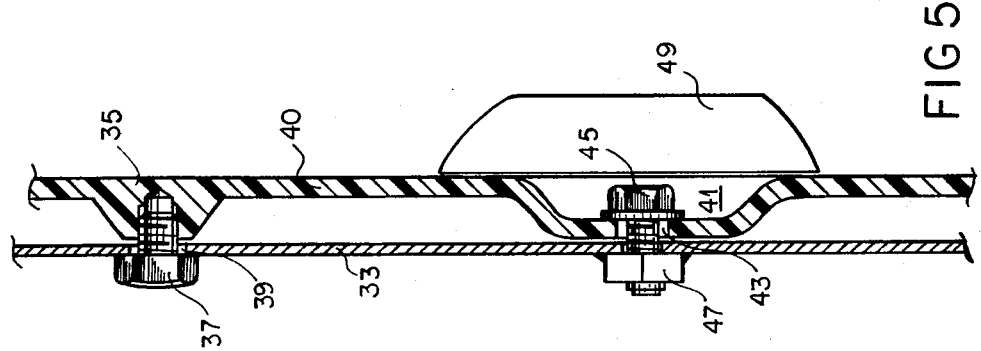
FIG. 5 is a vertical section through the front panel region of the door according to this invention.

FIG. 5 shows how an outer panel 40 made of a synthetic resin is formed with recesses 41 and inwardly projecting bosses 35. An outer frame part 33 has nuts 47 welded to its inner face so that screws 45 passing through relative large holes 43 in the recesses 41 can engage in these nuts 47.

The outer door panel 40 can therefore be mounted in place with the rest of the door assembly simply by loosely mounting it via the screws 45, then positioning it exactly by tightening these screws 45. Then the screws 37 are seated from the other side to hold the arrangement tightly in place and a trim strip 49 is applied to cover the recesses 41 and screws 45. The strip 49 can be purely decorative but can also serve as projection.

It is also apparent from FIG. 2 that with the outer door panel removed it is possible to adjust the lower ends of the guides 28 for the pane 11. This can be done while the door is closed for perfect alignment.

Figure 6:
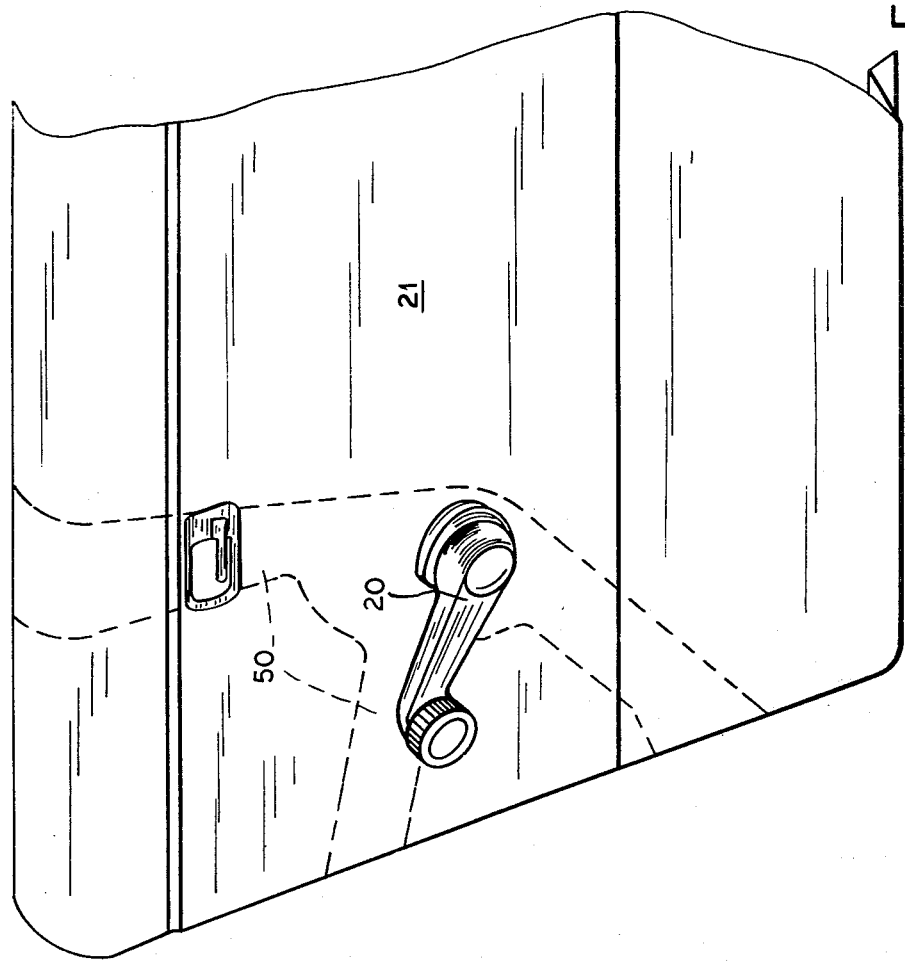
FIG. 6 is a perspective partly broken-away view showing another door according to this invention.

Finally FIG. 6 shows an arrangement wherein a Y-shape reinforcement 50 is provided in the inner door panel 21 to secure the handle 20 for opening and closing the window. Such use of a reinforcement 50 allows the inner door panel 21 to be made of very light material.

With the system according to the instant invention, therefore, the complex task of getting all of various mechanisms of the vehicle side door properly adjusted and mounted in place becomes relatively easy with the outer door panel off. Mounting this outer door panel itself is a relatively easy operation, one possible with perfect alignment of the outer door panel which can be shifted prior to permanent installation relative to the rest of the door assembly. The result is an extremely well-constructed door that nonetheless is cheaper to manufacture than the prior-art door.

We claim:
1. A motor-vehicle door comprising:
   a door frame having an inner side and an outer side and formed with a plurality of narrow threaded apertures opening at said outer side and with a plurality of relatively wide throughgoing holes;
   a hinge connected to said frame between said sides;
   an inner door panel against said inner side;
   means releasably securing said inner panel to said inner side for forming of said frame and inner panel a door assembly;
   a window pane vertically displaceable in and above said frame;
   window-operating mechanism on said assembly connected to said pane for raising and lowering same;
   a door latch on said frame;
   door-latching mechanism on said assembly connected to said latch for operating same;
   an outer door panel against said outer side and formed with respective relative wide holes at the narrow apertures of the frame and with a plurality of relatively narrow and inwardly open threaded apertures; and
   means including respective relatively narrow screw fasteners engaging through said wide holes in said threaded apertures for releasably securing said outer panel to said outer side for mounting said outer panel on said assembly and removing said outer panel from said assembly without removal of said inner panel, the loose fit of said fasteners in said wide holes permitting said outer panel to be shifted on said frame.

2. The door defined in claim 1 wherein said frame has at said outer side a flange to which said outer panel is securable by the respective securing means.

3. The door defined in claim 1 wherein said mechanisms and latch are adjustable from outside said door with said outer panel removed.

4. The door defined in claim 1, further comprising a removable trim strip covering said hole and screw on said outer panel.

5. The door defined in claim 1 wherein said frame includes an inner frame part and an outer frame part and reinforcement at said hinge.

6. The door defined in claim 5 wherein said pane can rise out of said door between said frame parts.

7. The door defined in claim 5 wherein said inner frame part forms with said outer frame part a pair of upright tubular box-girder sections, said latch and hinge being mounted on said sections.

8. The door defined in claim 5 wherein said inner frame part forms with said outer frame part a U-shaped tube having a pair of upright legs and a base.

* * * * *